United States Patent [19]
Blackwell

[11] 3,780,941
[45] Dec. 25, 1973

[54] AIR CONDITIONING SYSTEM AND METHOD
[75] Inventor: Sam M. Blackwell, Chatham, N.J.
[73] Assignee: A. I. McFarlan Company Incorporated of New Jersey, Springfield, N.J.
[22] Filed: June 29, 1972
[21] Appl. No.: 267,693

[52] U.S. Cl. .................. 236/49, 98/1.5, 236/1 B
[51] Int. Cl. ............................................. G05d 7/06
[58] Field of Search .................. 236/49, 13, 1 B; 165/16; 98/1.5

[56] References Cited
UNITED STATES PATENTS

| | | | |
|---|---|---|---|
| 3,117,723 | 1/1964 | Church | 236/13 |
| 2,923,222 | 2/1960 | Manning et al. | 98/1.5 |
| 2,316,237 | 4/1943 | Grunet et al. | 98/1.5 |
| 3,154,247 | 10/1964 | Carlson | 236/1 B |
| 3,687,364 | 8/1972 | McNabney | 236/49 |
| 2,188,775 | 1/1940 | Locke | 236/1 B |

Primary Examiner—William E. Wayner
Assistant Examiner—William E. Tapolcai, Jr.
Attorney—Harold L. Stults

[57] ABSTRACT

A central air conditioning system insures acceptable operating conditions over a wide range of heat loads. Air at a controlled temperature and uniform pressure is supplied through high pressure ducts to the vicinity of each of the various zones of the building. The air for each zone then flows from the high pressure duct through a pressure-reduction box or pressure regulator to a low pressure duct from which the air is discharged through variable volume outlets which are thermostatically controlled so that they supply reduced quantities of air at reduced loads. The pressure regulator controls the flow of air from the high pressure duct system to each low pressure duct so as to regulate the air pressure in the low pressure duct. The pressure regulator is controlled by the air temperature in the zone of its low pressure duct so that under low load conditions the air pressure in the low pressure duct is reduced below the pressure in that duct under high load conditions.

7 Claims, 1 Drawing Figure

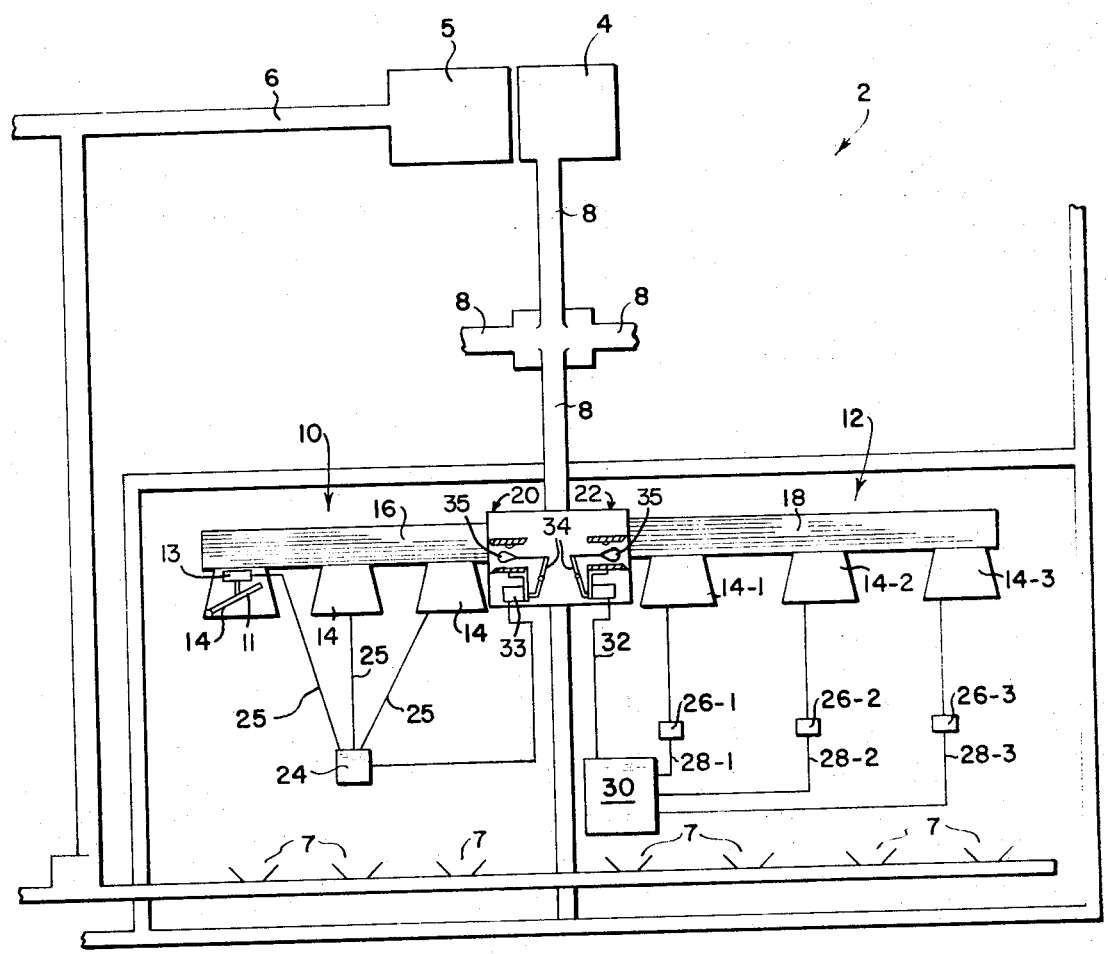

AIR CONDITIONING SYSTEM AND METHOD

This invention relates to air conditioning systems and methods, and more in particular to systems wherein conditioned air is distributed at relatively high pressure to various zones of the conditioned space and is then discharged into each zone under thermostatic control so that the volume of air being discharged is controlled to maintain comfort conditions.

In systems of the general type of the present invention, the air at high pressure flows through high pressure ducts to the vicinity of each zone and there is a low pressure duct at each zone which is connected to the high pressure duct by a pressure reduction box which has adjustable air flow means. A constant pressure regulator which is responsive to the air pressure in the low pressure duct controls the adjustable air flow means for the purpose of maintaining a predetermined reduced pressure in the low pressure duct. The air is discharged from the low pressure duct through adjustable diffusers, each of which is thermostatically controlled so as to open or close as required to maintain the desired temperature in the zone.

An object of this invention is to improve the operation of systems of the above type and to provide such systems with simplified controls. A further object is to simplify design and installation problems and remove limitations which have been encountered with systems of the above character. These and other objects will be in part obvious and in part pointed out below.

The single FIGURE in the drawing is a schematic representation of one embodiment of the invention.

Referring to the drawing, a central air conditioning system 2 of the "Envelope" type includes a central air-treating unit 4 which supplies air at a controlled temperature and constant pressure through a number of high pressure ducts 8 to the interior of the building; and, an air treating unit 5 which supplies a constant volume of air at a controlled temperature through a number of high pressure ducts 6 to the exterior of the building. Each of the ducts 6 and 8 extends to a number of zones of the building, the two zones 10 and 12 being illustrative. The air supplied through ducts 6 is discharged through fixed outlets 7 around the periphery of the building, and the temperature of that air is varied inversely with respect to the outside temperature so as to balance the heating and cooling loads resulting from the conduction of heat through the exterior walls of the building. With this system the interior of the building is always a cooling load which varies because of changes in the operation of the lights and machines, the occupants and the sun effect.

Each of the interior zones has one or more variable volume outlets or diffusers 14 by which the volume of air discharged into the zone is thermostatically controlled in response to the temperature in that zone. Each diffuser 14 has an air motor 13 which operates vanes represented by vane 11. The air being discharged is below the temperature maintained in each of zones 10 and 12 so that a rise in the zone air temperature causes an increase in the volume of air delivered through the diffuser or diffusers in that zone, and a drop in the zone air temperature causes a reduction in the volume of air discharged. Each of zones 10 and 12 has three diffusers 14 connected respectively to zone ducts 16 and 18 extending from a duct 8. Zone ducts 16 and 18 are connected to duct 8 respectively through pressure reduction boxes 20 and 22. Each of these boxes acts to reduce the pressure and to control the flow of air from the high pressure duct 8 to its zone duct. That control is exerted by an air motor 33 which acts through a lever 34 to move to move an element 35, and acts in response to changes in the pneumatic pressure from a thermostat as will be explained below. Each of the diffusers 14 has movable flow-control louvers or vanes forming an outlet opening the size of which is controlled by a motor which is also responsive to pneumatic thermostat control.

In zone 10 there is a single thermostat 24 which controls all of the diffusers in that zone, and which also controls the pressure reduction box 20. Thermostat 24 varies the pressure in the pneumatic control lines 25 from zero when the minimum flow of air is required to 15 pounds per square inch when the maximum flow of air is required. Assume that the maximum amount of air is being delivered to zone 10, and that there is now a reduction in the temperature in the zone below the desired temperature. Thermostat 24 senses that change and reduces the pressure in the pneumatic control lines 25. That operates the motors in diffusers 14 to partially close the diffusers and thereby reduce the volume of air being discharged. Simultaneously, it operates the motor in box 20 t0 decrease air flow from the box, thus tending to reduce the pressure of the air in duct 16. However, the partial closing of the diffusers reduces the amount of air discharged through them and that prevents the drop in pressure in duct 16 which would occur if the diffusers were to remain fully open. The net result of these two control effects is to provide a stable control condition in which a reduced amount of air is supplied to zone 10 and a stable pressure is maintained in duct 16.

With prior air conditioning systems of this type, attempts have been made to provide stable and reliable operating conditions by attempting to control each pressure reduction box to maintain a constant pressure in its distribution duct. With that arrangement, the pressure reduction box utilizes a constant pressure regulator with a sensing element which is responsive to the static pressure in its zone duct and preferably is positioned in a straight run of the zone duct and located a substantial length of the zone duct downstream from the box. That makes it necessary at times to provide an extra length of the zone duct to provide the straight run so that the box is located a substantial distance upstream from its zone. It is very important to provide minimum lengths of the zone ducts because a given volume of air requires a much smaller high pressure duct than it requires at the low pressure in the zone duct downstream from the box.

The present invention provides reductions in the lengths of the low pressure zone ducts which is very advantageous from the standpoint of utilization of space, freedom of design and cost. The high pressure distribution ducts normally extend to each of the zones, so that the zone ducts are of minimum length, there is no unusual limitation with respect to the shapes or the lengths of the zone ducts.

The control of the pressure reduction boxes to maintain a constant pressure in the distribution ducts, as has been done in the past, creates additional problems in zones where there is an extremely wide range of load conditions. The diffusers must be operable to provide the corresponding wide range of the delivery of air.

However, the maintenance of a constant pressure in a zone duct produces limitations on the range of the rate of air delivery.

With the present invention, it is unnecessary to provide for controls responsive to the pressure in each of the zone ducts. The diffusers and the box are controlled simultaneously and their operations are synchronzied by the action of the single thermostat 24. Nevertheless, the control patterns for the diffusers and for the box can be changed independently of each other, and the two patterns can be worked out to give a wide variety of overall results. For example, it is possible to increase the air pressure in duct 16 when the diffusers approach the minimum air flow setting to maintain the proper throw of the air from the diffusers. Such an increase can be provided by stopping the operation of closing the louvers in the box, illustratively at a pneumatic pressure of 3 pounds, so that the box has a constant setting below that pneumatic pressure while the diffusers continue to close down as the pneumatic pressure decreases to zero. In that way, the pressure in duct 16 follows the pattern discussed above during the movement of the diffusers from the maximum air flow condition down to three pounds pneumatic pressure. Below that pressure, as the box continues with the same opening, the further closing of the diffusers causes the air pressure to build up in the duct. That elevated pressure permits the diffusers to provide the desired wide range of the rate of air delivery. However, it should be noted that the volume of air delivered is a function of the air pressure in zone duct and the size of the diffuser openings, and that the diffuser openings at the minimum settings are smaller when the air pressure is increased for low air flow conditions. The invention also contemplates that the diffusers can be closed completely at minimum cooling load conditions so that the entire cooling load is handled by outlets 7.

Except as otherwise explained, the construction and operation of the air distribution arrangement in zone 12 is the same as in zone 10. The principle difference is that in zone 12 each of the three diffusers 14 has its own thermostat 26, and there is a controller 30 through which box 22 is controlled. The diffusers and their associated thermostats are identified by the suffixes −1, −2 and −3. Each of the thermostats 26 has the usual pneumatic control line connected to its diffuser, and it also has a pneumatic control line 28 connecting it to controller 30. Controller 30 is connected through a pneumatic control line 32 to box 22, and it acts to pass on to box 22 the maximum pneumatic control pressure received from the various thermostats 26 through their respective lines 28. Hence, box 22 is always set to provide duct 18 with air as required by the diffuser which is called for the maximum amount of air. For example, assume that the maximum amount of air is being supplied through all of the diffusers, and that thermostats 26-1 and 26-2 then detect drops in the temperature while thermostat 26-3 does not. Diffusers 14-1 and 14-2 will then be partially closed, while thermostat 26-3 still requires maximum cooling and diffuser 14-3 remains fully open. Under those conditions, controller 30 does not change the setting of box 22. But if thermostat 26-3 were then to require a reduction in cooling, controller 30 would reset the pressure reduction box 22 to correspond with the setting of the diffuser requiring the maximum air flow. In this embodiment, box 22 is provided with a stop on its control motor which prevents the continued closing of the volume control means as the diffusers approach the minimum air volume conditions, as has been discussed above.

The control arrangement in zone 12 can be used quite advantageously for a large zone having a portion where there is a wide variation in the cooling load during the summer. For example, if the corner of the building has a substantial amount of window area, the variations in the sun effect can cause wide variations in the cooling load in that portion of the zone. However, where the laod conditions are substantially uniform in the entire zone, generally the control arrangement of zone 10 is preferable. It is thus seen that the present invention avoids the difficulty referred to above which have been encountered with similar systems. Also, the present invention provides simplified modes of operation in which the patterns of variation in the air flow can be varied readily in each of the zones.

What is claimed is:

1. In an air conditioning system, the combination of, means to condition and distribute conditioned air at an elevated pressure to a plurality of zones through main distribution ducts and thence through a zone distribution duct for each of a plurality of zones, variable-volume diffuser means to discharge air from each of said zone distribution ducts into its zone, pressure-reduction means for each of said zones connected to receive conditioned air from one of said main distribution ducts and to discharge it at a reduced pressure into the respective zone distribution duct, and thermostatic means for each zone responsive to the air temperature in that zone and operative to control said pressure-reduction means and said diffuser means for that zone and thereby regulate the volume of air being diffused.

2. A system as described in claim 1 wherein said thermostatic means comprises a single thermostat in said one zone connected to control said pressure-reduction means and diffuser means for that zone.

3. A system as described in claim 1 wherein said diffuser means in one zone comprises a plurality of diffusers, and wherein said thermostatic means for that zone comprises a plurality of separately operable thermostats connected respectively to control said diffusers whereby each diffuser discharges a volume of air which is varied in accordance with the temperature sensed by its thermostat, and wherein said thermostatic means for that zone includes selector means to transmit to said pressure-reduction means for that zone control functions from the thermostat for the diffuser requiring the delivery of the maximum volume of air.

4. A system as described in claim 1 wherein said pressure-reduction means includes means to reduce the air flow passageway therethrough and said diffuser means reduces the volume of air by reducing the air flow passageway therethrough, and wherein said thermostatic means acts in response to a progressing demand for a reduction in air flow to continue the reduction in the air flow passageway of said diffuser means with an unchanged air flow passageway through said pressure reduction means when the volume of air being diffused is below a predetermined value.

5. In a method for controlling an air conditioning system having a central supply for conditioned air which is distributed through a duct system at elevated pressure to a plurality of zones and is delivered to each zone through a reduced pressure duct at a reduced pressure and is then discharged into the zone, the steps of, controlling the flow of air into the reduced pressure duct for one zone in accordance with the temperature in that zone, and controlling the volume of air discharged from said reduced pressure duct in accordance with the temperature of the air in that zone.

6. The method as described in claim 5 wherein the volume of air flowing into said reduced pressure duct is varied in accordance with a pattern which is different from that of the variations in the rate at which air is discharged from that reduced pressure duct.

7. The method as described in claim 5 wherein the air is discharged through a plurality of diffusers each of which has a thermostat control responsive to the temperature of the air in that zone, and wherein the control of the flow of air in the said reduced pressure duct is exerted as a function of the control of the diffuser requiring the maximum volume of air.

* * * * *